United States Patent [19]

Lewis

[11] Patent Number: 4,477,483

[45] Date of Patent: Oct. 16, 1984

[54] APPARATUS AND METHOD FOR CONTROLLING THE APPLICATION OF LIQUID SUBSTANCES TO SURFACES OF FRUIT

[75] Inventor: Philip J. Lewis, Corona, Calif.

[73] Assignee: Brogdex Company, Pomona, Calif.

[21] Appl. No.: 478,469

[22] Filed: Mar. 23, 1983

[51] Int. Cl.³ ............................................. B05D 1/02
[52] U.S. Cl. ........................................ 427/8; 118/19;
118/22; 118/24; 118/25; 118/669; 118/676;
118/677; 118/680; 118/683; 118/684; 427/424
[58] Field of Search ...................... 427/8, 424; 118/19,
118/22, 24, 25, 669, 676, 677, 679, 680, 683, 684

[56] References Cited

U.S. PATENT DOCUMENTS

| | | | |
|---|---|---|---|
| 2,618,562 | 11/1952 | Mulvany | 118/24 |
| 2,898,881 | 8/1959 | Straley | 118/24 |
| 3,594,211 | 7/1971 | Drum | 427/8 |
| 3,818,859 | 6/1974 | Kalmar | 118/24 |
| 4,032,670 | 6/1977 | Warning et al. | 427/8 |
| 4,055,683 | 10/1977 | Gusarov et al. | 427/8 |

Primary Examiner—Michael R. Lusignan
Assistant Examiner—Janyce A. Bell
Attorney, Agent, or Firm—Poms, Smith, Lande & Rose

[57] ABSTRACT

An apparatus and method for controllably applying a liquid substance to the surfaces of a plurality of discrete fruit moving along a path at a selected rate of speed and in accordance with the quantity of fruit on said path, the application of liquid substance to the fruit being by more than one nozzle movable transversely over the path at a selected rate of speed. The apparatus includes sensors for determining the speed of advancement of the fruit, that is the speed of the conveyor, a plurality of fingers engageable by the fruit to determine, by absence of engagement of fruit, the quantity of fruit moving along the path, and a control system for regulating the amount of liquid discharged from the nozzles and to correlate the amount of liquid discharged to the speed of advancement of the fruit and the quantity of fruit being advanced. In the method, an optimum effective volume of liquid substance is applied at selected pressures to the sensed quantity of fruit on the path.

19 Claims, 5 Drawing Figures

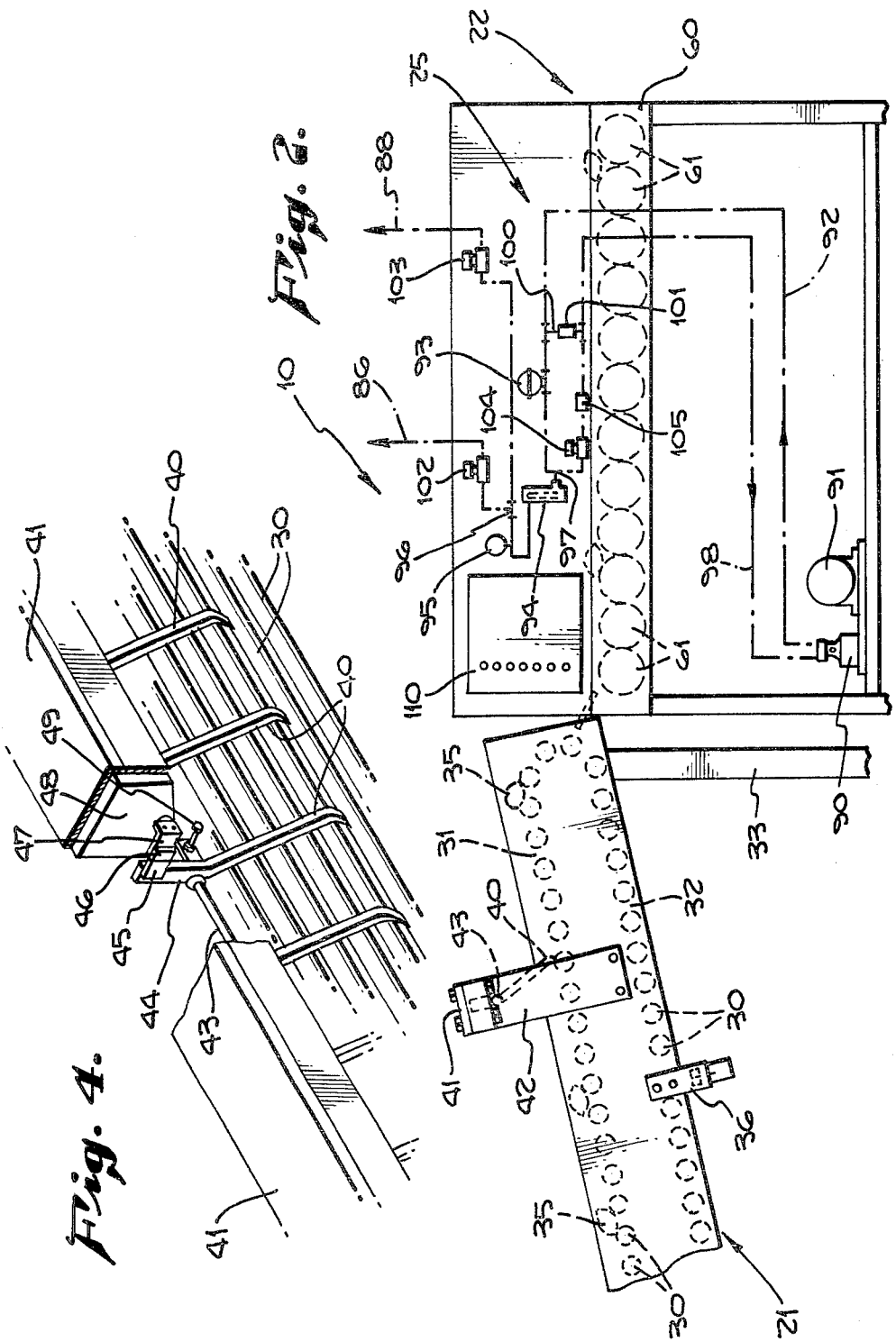

APPARATUS AND METHOD FOR CONTROLLING THE APPLICATION OF LIQUID SUBSTANCES TO SURFACES OF FRUIT

BACKGROUND OF INVENTION

The present invention relates to an apparatus and method for controlling the application of liquid substances such as wax and fungicides to surfaces of fruit such as citrus fruit, apples and other fruit where is is desirable to apply a uniform coating over the surface of the fruit for appearance enhancement, decay control, and sporulation control. The liquid substances may comprise an aqueous or solvent solution of various resins or mixtures and of resins and wax emulsions, together with selected fungicidal compositions.

A prior proposed apparatus and method of treating fruit is described in U.S. Pat. No. 2,898,881 issued Aug. 11, 1959, owned by the assignee of this application, in which a liquid wax was sprayed on surfaces of fruit by an atomizing nozzle which was reciprocally moved in two parallel paths transversely of the direction of movement of the fruit on a brush roll conveyor. The nozzle was uniformly spaced above the conveyor and sprayed the liquid wax over a treating zone through which the fruit was passed and agitated to expose virtually all of the surface of the fruit to the spray. In one example in the patent two nozzles were employed in the transverse treating zone, each nozzle being carried by a separate sprocket and chain and reciprocally moved through the transverse spray zone. In this patented apparatus, the rapidity of oscillation of the nozzles was directly correlated to the linear rate of advancement of the fruit along the brush roll conveyor and the size of the nozzle means was selected to operate under a given pressure so that the cone shaped spray pattern caused forcible impingement of the atomized liquid wax against the fruit surfaces.

Other prior proposed apparatuses and methods for spraying of aqueous and non-aqueous liquid substances on fruit have included arrays of fixed nozzles of selected size and operable at selected pressures to direct an atomized spray against the surfaces of fruit as the fruit passed thereunder on a brush roll conveyor.

In such prior proposed apparatuses for application of liquid substances to fruit surfaces, the amount of liquid substance discharged from the spray nozzles was predetermined and was discharged from the nozzle even though the amount of fruit on the brush roll conveyor substantially varied in quantity. In addition, the speed of the conveyor for the fruit while desirably set for a selected speed, was often varied in order to attempt to assure that the brush roll conveyor was substantially filled or covered with a maximum amount of fruit. Feeding of fruit to such a conveyor was often at a nonuniform rate and the speed of the brush roll conveyor might be manually modified. The amount of liquid substance discharged by the nozzles during reciprocation might be varied by manually modifying the pump speed to change the rate of flow and also the fluid pressure in order to seek a more uniform and effective distribution of the sprayed liquid substance. However, manual adjustment of pump sppeed, rate of flow, pressure, conveyor speed, and rate of nozzle reciprocation made the desired results of uniform consistent gloss or shine on the fruit surface, uniform fungicide protection, reduced wax buildup on equipment, and improved wax consumption difficult to achieve.

It will be apparent that when a brush roll conveyor was not carrying a maximum quantity of fruit that in the absence of certain quantities of fruit the amount of spray discharged remained substantially the same and as a result was discharged not principally upon fruit surfaces but upon the brush rolls and resulted in an unwanted accumulation of liquid substance or wax on the conveying brush rolls. Periodic shut down of the apparatus was required to permit cleaning of excess waxy substances from the brush roll conveyor. Further, application of wax by the nozzles to vacant area portions of the brush roll conveyor was essentially a waste of the liquid wax and contributed to rapid buildup of wax.

SUMMARY OF INVENTION

The present invention contemplates an apparatus and method for applying a liquid wax aqueous substance to the surfaces of a plurality of discrete objects in an efficient, effective manner to provide uniform consistant coverage of the object surfaces to obtain a uniform gloss or shine on such surfaces, uniform fungicide protection for objects, such as fruit, a reduction in the amount of liquid substance accumulated on treating equipment because of the absence of objects to be coated, and a more efficient, effective use of the available liquid substance. The present invention contemplates an improved apparatus and method over that of U.S. Pat. No. 2,898,881.

One of the main objects of the present invention is to provide means for controlling the amount of discharge of liquid substance from a plurality of nozzles to optimize the application of the liquid substance to surfaces of discrete objects such as citrus fruit.

Another main object of the present invention is to provide a method of controlling the amount of liquid treating substance applied to a plurality of discrete fruit moving along a path at a varying rate of speed and in accordance with the quantity of fruit on the path so that an optimum effective volume of liquid substance at selected different pressures will be applied to the amount of fruit on the brush roll conveyor.

Another object of the present invention is to provide an apparatus for spray application of a liquid substance to fruit in a treating zone wherein one or more sets of large and small capacity nozzles are employed for application of the liquid substance.

A further object of the present invention is to provide a method for controlling the amount and pressure of liquid substance discharged from the spray apparatus to the fruit to be treated passing therebeneath.

Another object of the invention is to provide a spray apparatus comprising one or more sets of large and small nozzles adapted to be reciprocally or oscillatably simultaneously movable in a transverse treating zone across the path of travel of discrete fruit and in which the sets of nozzles are interconnected for synchronous movement in said transverse zone.

A further object of the invention is to provide an apparatus for sprying a liquid substance on fruit passing beneath spray nozzles in which said nozzles are arranged in sets of large and small nozzles and in which each nozzle of each set has a separate liquid substance feed line which is controllable as to the presence and amount of liquid substance fed therethrough.

A still further object of the present invention is to provide a control system for flow of a liquid substance to a plurality of nozzles in such a manner that the flow may be readily varied and controlled over a plurality of selected flow and pressure levels to quickly and readily accommodate the flow of such liquid substance to the quantity of fruit on the conveyor, the speed of movement of the conveyor, the rate of oscillatory movement of the nozzles, and the discharge pressure of the nozzles in spraying the liquid substance.

A still further object of the invention is to provide a method as stated above in which the parameters determining the pressures at the discharge nozzles are sensed and read periodically by suitable instruments to monitor and adjust the volume of liquid substance applied.

The invention contemplates an apparatus and method for treating discrete objects by the application of a uniform coating to virtually all surfaces of the objects wherein said objects are first advanced on an elevator conveyor toward a brush roll conveyor which passes through a treating zone beneath transversely reciprocally movable sets of large and small nozzles. On the elevator conveyor, a switch means is provided to sense the speed of the conveyor. Above the elevator conveyor may also be arranged a plurality of fingers which preferably sense the absence of an object of the conveyor. The rate of advancement of the elevator conveyor and the presence or absence of fruit on the conveyor provides information for control and regulation of the application of the liquids wax substance. This information is fed to a computer which has been connected to three solenoid valves in the liquid substance flowlines, one solenoid valve being in a bypass line as later described, a second solenoid valve being in a feed line to large nozzles, and a third solenoid valve being in a feed line to smaller nozzles. The invention contemplates the selection of a sized large nozzle and sized small nozzle and the operation of said nozzles at combinations of high and low pressures which together with the control of pressure flow by the valve in the bypass line permits the flow rate of discharge from the set of nozzles to be varied over a plurality of stages or levels depending upon the conveyor speed and quantity of fruit being introduced into the treated zone. Thus the computer causes the discharge of liquid substance from the set of nozzles at various combinations of high and low pressure so that uniform treatment of fruit is achieved even though the quantity of fruit and the speed of advancement of the fruit through the treating zone may vary.

Various other objects and advantages of the present invention will be readily apparent from the following description of the drawings in which an exemplary embodiment of the invention is shown.

IN THE DRAWINGS

FIG. 1 is a top plan view of an apparatus embodying the present invention, the control system not being shown, the view being taken in the plane indicated by line I—I of FIG. 3.

FIG. 2 is a side elevational view of the apparatus shown in FIG. 1 and includes a schematic line diagram of the control system for the liquid substance.

DESCRIPTION OF PREFERRED EMBODIMENT OF INVENTION

Figure 4:
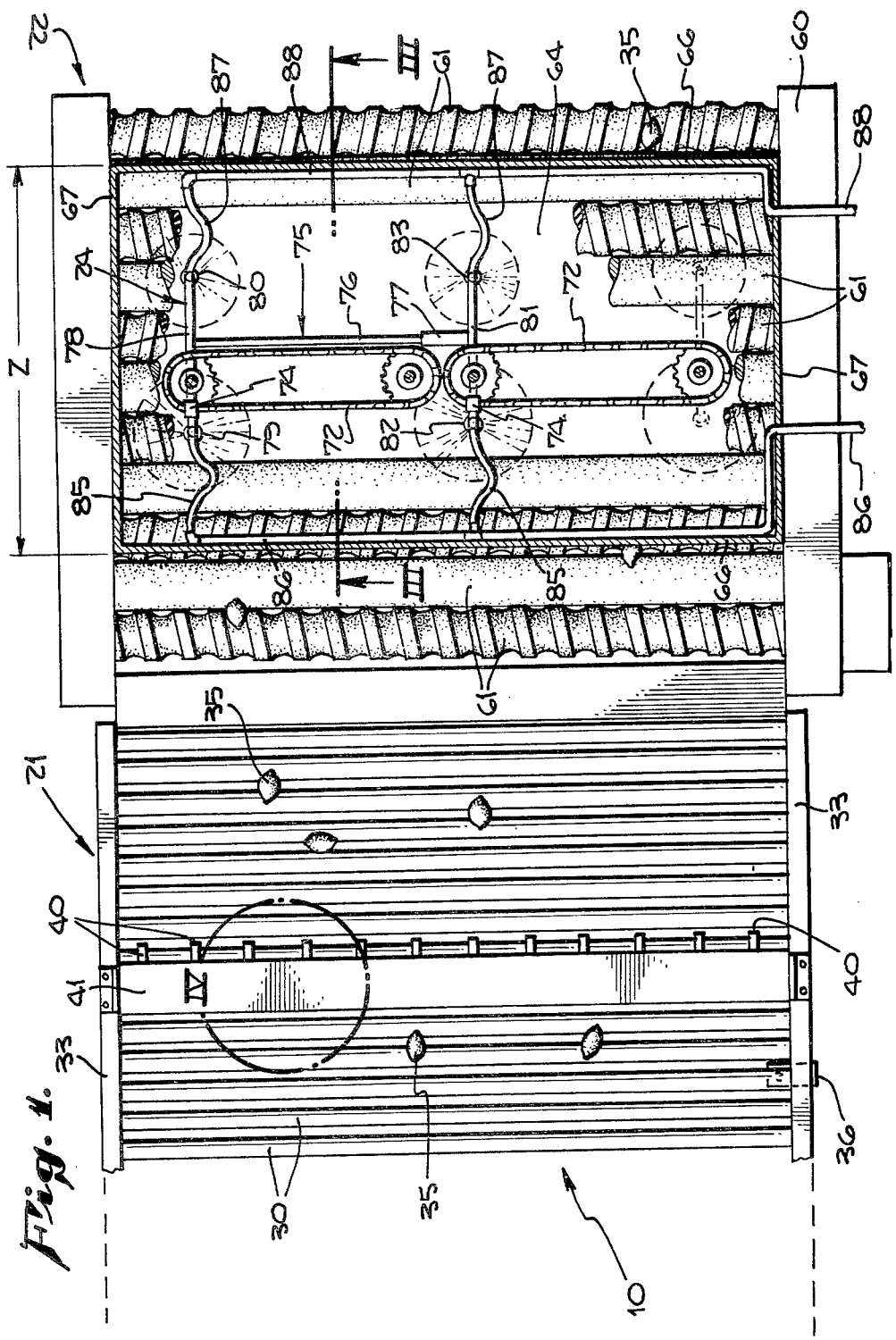
FIG. 4 is a fragmentary view of switch means at the elevator conveyor for sensing the absence of fruit on the conveyor and is taken in an area indicated by the circle 4 of FIG. 1.

In FIGS. 1 and 2 the apparatus generally indicated at 20 embodies one example of this invention and generally comprises an elevator conveyor means 21 and a brush roll conveyor means 22 providing a treating zone Z extending transversely of the conveyor means 22. Above the treating zone Z may be spray applicator means generally indicated at 24. Spray applicator means 24 may include certain features of U.S. Pat. No. 2,898,881 as mentioned hereafter. The liquid substance control system of this invention is generally indicated at 25 in FIG. 2.

Fruit to be treated, in this example, citrus fruit such as lemons, oranges and grapefruit may be transported to and fed to elevator conveyor 21 which is inclined slightly upwardly to assist in distribution of the fruit over the conveyor. The elevator conveyor may comprise a plurality of transversely arranged steel rolls 30 driven by suitable motor means about an endless track having an upper lay 31 and a lower lay 32. Suitable frame means 33 support sprocket means (not shown) for the endless conveyor and provides support necessary for the drive chain (not shown) to move the rolls 30 and particularly the upper lay 31 at a selected rate of speed. The steel conveyor rolls 30 are relatively closely spaced and adjacent rolls provide support for a transverse line of fruit 35. The construction of such a fruit elevator conveyor 21 is well known.

As part of the wax control system, the elevator conveyor 21 is provided with a proximity switch 36 supported on the frame adjacent the bottom lay of the conveyor. Proximity/switch 36 is adapted to sense the passage of each roll 30 in order to determine the rate of advancement of the rolls 30 of the conveyor 21 and the fruit carried thereby.

Also as part of the wax control system the elevator conveyor is provided with a plurality, in this example 12, of reed-type switch fingers 40 (FIG. 4) arranged in a transverse row and carried by a suitable transverse bridge structure 41 supported by upstanding side members 42 secured to frame 33 at opposite sides of the elevator conveyor. Each finger 40 may be pivotally mounted on a transversely extending rod 43. An upstanding top end portion 44 of each finger 40 may carry a magnetic switch element 45 which coacts with a magnetic switch element 46 carried on a bracket 47 supported on a plate 48 carried by bridge 41. Suitable means for adjustment of the position of the contacts is shown at 49. In this example each finger 40 is positioned with its distal end proximate to rolls 30 with the switch in closed position and arranged to sense and to provide information as to the absence of a fruit in the transverse line of switch fingers 40. When a fruit contacts finger 40, the switch is moved to open position and thus subtracts from the total quantity of absent fruit in order to determine the actual quantity of fruit advancing on the elevator conveyor. It will be understood that the quantity of fruit on the conveyor may be determined in the opposite manner; that is, by having the fingers contact and count the presence of a fruit, although in practice it has been found that finding the quantity of fruit by recording absence of fruit is more accurate and satisfactory within the count tolerance allowed. It should be noted that this arrangement of fingers 40 does not determine an exact count of fruit, but provides a sampling of the amount of fruit on the conveyor which will be sufficiently accurate for the purposes of this invention. It will also be understood that means could be provided for counting each fruit, although at the present time such an accurate count is not required for purposes of this invention.

Figure 3:
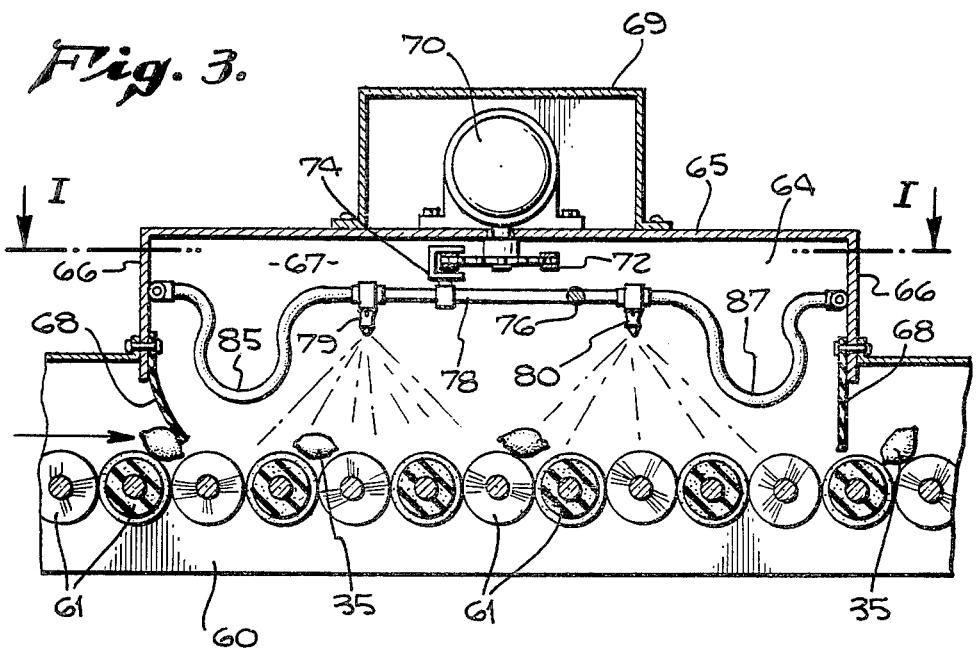
FIG. 3 is a fragmentary vertical sectional view taken in the plane indicated by line III—III of FIG. 1.

The brush roll conveyor 22 may be constructed similarly to that shown in patent 2,898,881 and may comprise a frame means 60 providing support for a plurality of transversely arranged brush rolls 61 which are driven by an endless loop arrangement powered by suitable motor means (not shown), the upper lay 62 thereof being shown in FIGS. 1 and 3. The brush rolls 62 may comprise alternately arranged plain cylindrical rolls and sculptured rolls provided with a shallow spiral groove or indentation therein. Alternate sculptured rolls may be pitched or turned in opposite directions so that a fruit advanced by the plain and sculptured rolls will be tumbled and turned about its several axes so as to cause each fruit to present virtually all of its surface area to the spray application.

The treating zone Z may include a treating chamber 64 defined by a top wall 65, side walls 66 and end walls 67. Suitable flexible flaps 68 may further define the treating zone chamber, the flaps 68 being made of a suitable compliant flexible material so that the fruit conveyed by the rolls 61 may readily pass into and out of the treating zone chamber 64. Top wall 65 may carry a suitable cover 69 for a motor means 70 which serves to drive a pair of sprocket chains 72 arranged transversely of the brush roll conveyor in a manner similar to that shown in U.S. Pat. No. 2,898,881. In this respect the brush roll conveyor treating zone chamber and arrangement of dual chain and sprocket means within the chamber may be similar to that described in said U.S. Pat. No. 2,898,881.

In the present invention the endless chains 72 are each provided a connection at 74 with a nozzle carrying frame 75 which may comprise a transversely extending rod 76 telescopically received within a cylindrical socket 77 to permit limited flexibility and longitudinal adjustment of the length of frame 75. At one end of rod 76, a transverse bar 78 extends longitudinally of the conveyor means and carries at the upstream end of the bar a large nozzle 79 and at its opposite end a small nozzle 80. In similar manner, the cylindrical member 77 is connected to a bar 81 extending longitudinally of the conveyor and providing a large nozzle 82 at the upstream end of bar 81 and at its opposite downstream end a small nozzle 83. The frame 75 thus interconnects the set of nozzles 79, 80 at one end thereof with the set of nozzles 82, 83 at the other end thereof, each set being connected at 74 to the respective endless chain means 72. Thus, the sets of nozzles are oscillatable or reciprocally movable transversely of the conveyor means 22 and within the treating zone to provide transverse spray patterns for each lrge nozzle and small nozzle and displaced longitudinally of the brush roll conveyor 22 by the width of the chain and sprocket means 72 and length of bars 78, 81. The telescopic arrangement of rod 76 and cylinder 77 provides sufficient flexibility of the frame 75 so that the chains 72 when driven in synchronous manner, will not be disengaged from their sprocket track.

Each of nozzles 79, 80 and 82, 83 may be pivoted or swivel mounted with respect to chains 72 and may be spaced above the conveyor 22 a distance such that the nozzle spray pattern is intact when spray particles thereof impinge on the fruit surfaces as described in said patent. Further, the spraying zones of the four nozzles are arranged to slightly overlap to provide full spray coverage of fruit passing through the treating zone in a virtually uniform manner.

Means for supplying the liquid substance to the large and small nozzles while the nozzles are reciprocally moved in parallel paths may comprise liquid flowlines 85 leading from a supply line 86 to large nozzles 79, 82 and liquid flowlines 87 leading from a flowline 88 to small nozzles 80, 83. Each of lines 85 and 87 are flexible and include sufficient length to accommodate the path of travel of the associated nozzles during operation without stretching or causing a disconnection of the flowline from its connection to the line 86 or 88.

Means for supplying a liquid substance to the feed lines 86, 88 is shown schematically in FIG. 2 and includes a pump 90 of suitable type driven in usual manner by a motor means 91. The pump is connected to a supply reservoir of liquid substance in usual manner and is not shown. Liquid is discharged from pump 90 along flowline 92 past an accumulator 93 through a flow meter 94 and past a pressure gauge 95. Accumulator 93 serves the purpose of reducing and minimizing any surges in the flow of the liquid substance which may be caused by pump 90. The liquid substance flows into a T-connection 96 providing a connection to line 86 and to line 88. Line 92 provides one side of a bypass arrangement which occurs at T-connection 97 adjacent the needle valve 94, the T-connection 97 being joined to a return line 98 which returns bypassed fluid to pump 90. A bypass line 100 is also provided between lines 92 and 98, the bypass line being provided with a flow control 101 having a fixed orifice of a selected size.

Means for providing a plurality of stages or varying levels of volume of liquid substance discharged by the sets of large and small nozzles in accordance with the quantity of fruit on the conveyor as sensed by fingers 40 includes the fixed orifice flow control 101, a solenoid valve 102 in the feed line 86 to the large nozzles, a solenoid valve 103 in the feed line 88 to the small nozzles and a solenoid valve 104 in the return line 98 and located upstream from a needle valve 105 in the return line 98. By selection of certain sizes of large and small nozzles, fixed orifice at flow control 101, and their correlation with the speed of advancement of the fruit on the conveyor as measured by the proximity microswitch 36 on the elevator conveyor 21 and with the sensing of the quantity of fruit on the elevator conveyor by the 12 reed switch fingers 40, the volume of liquid substance discharged from the large and small nozzles may be varied and controlled so that an optimum volume of liquid will be discharged from the sets of nozzles for the quantity of fruit passing through the treating zone Z. Such control of the volume of liquid substance discharged from the nozzles may be exemplarily indicated below in which six levels or stages of operating modes are illustrated. For example, the tabulation below indicates operational modes for the nozzles for certain ranges of quantity of fruit.

| Oper. Level Set Point | | Nozzle Size | Pressure | Flowmeter | Wax Consumption GPH | Equivalent Dump Rate 1000's Lb/Hr* |
|---|---|---|---|---|---|---|
| 0.5% | 1 | 3.00 | 45 | 30 | 3.9 | 0.6-44 |
| 38% | 2 | 0.58 | 70 | 38 | 4.9 | 44-53 |
| 46% | 3 | 4.50 | 40 | 45 | 5.8 | 53-66 |
| 57% | 4 | 0.92 | 65 | 57 | 7.4 | 66-81 |
| 70% | 5 | 3.00+ | 35 | 69 | 8.9 | 81-102 |
| 88% | 6 | 4.50 1.5 | 60 | 90 | 11.6 | 102- |

*10,000 LBS. Per Gallon Wax Consumption

In the above chart operating level refers to the percentage of fruit on the conveyor at the sensing area (fingers 40) in terms of the maximum amount of fruit adapted to be carried by the conveyor. The set point 1 indicates the stage set to selectively operably process that quantity of fruit and is further illustrated in FIG. 5. In preparation of such an operating level set point, the width of the conveyor elevator must be considered: the rolls per minute equivalent of 100% wax flow for a width of 5 feet being 276 rolls per minute; a width of 6 feet being 230 rolls per minute; and a width of 7 feet being 197 rolls per minute. It may also be noted that to convert from pounds per hour to the number of fruit per minute, a factor may be used of 100 fruit per 40 lbs. or multiply 1000 lbs. per hour times 41.67 would equal the fruit per minute.

Figure 5:
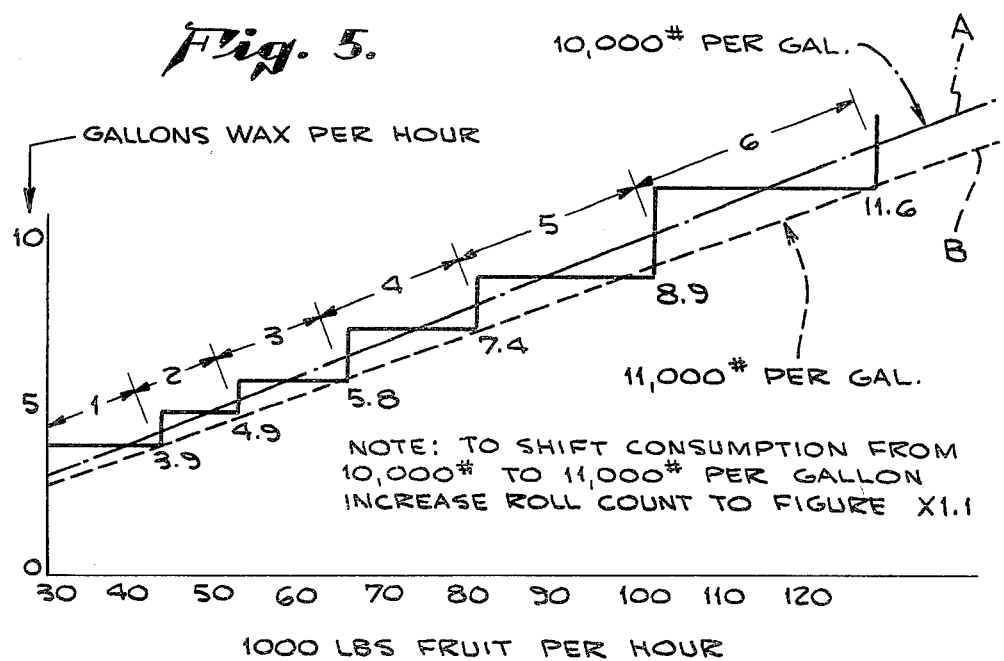
FIG. 5 is an exemplary chart indicating a method of determining the stages or levels of wax consumption in gallons per hour for pounds of fruit processed per hour and indicating the basis for operational selection of the large and small nozzles at combinations of high and low pressure to achieve such varying application of liquid substance.

The data given in the above chart is partially represented by the drawing in FIG. 5. In FIG. 5 two inclined lines A and B are shown, line A representing 10,000 lbs. of fruit processed per gallon of liquid substance and line B representing 11,000 lbs. of fruit processed per gallon. The inclination of lines A and B has been determined by experience and takes into account the tolerance allowed by the Food and Drug Administration which limits the amount of weight added to the fruit during processing to 150 parts per million and also takes into account that an exemplary gallon of liquid wax substance being applied contains about 18% solids. The line A thus represents a practical permissible range of weight to be added to the processed fruit. The six levels as mentioned above are identified in FIG. 5 by the spaces 1 through 6 and also by an indication of the gallons of wax per hour set forth adjacent each of the six levels. It will be understood that the arrangement of levels 1 through 6 illustrated in FIG. 5 in the chart above may be modified in that the ranges indicated for each of the levels may be changed to provide a somewhat different span of wax consumption of each level. It will also be understood that in the treating of different articles more or fewer stages may be used depending upon the desired refinement of the control of the amount of liquid wax substance being applied.

Means for controlling the flow of liquid substance from the pump to the sets of nozzles to achieve the desired discharge as indicated above may include the following method. It will be understood that the flow control orifice 101 in the bypass line 100 is selected to pass a constant volume of liquid substance during operation of the pump. In this example the size of the large nozzles 79 and 82 may be identified as 4.50 and the small nozzles 80, 83 as size 3.00. Information of the speed of the elevator conveyor 21 as read by the proximity switch 36 and of the quantity of fruit as indicated by the reed switch fingers 40 is fed to a computer 110. Computer 110 has been programmed so that when the quantity of fruit is between 50 and 400, as indicated above, the solenoid 103 is in open position, solenoid 104 is in open position and solenoid 102 is in closed position so that flow of liquid to the large nozzles is stopped and the flow to the small nozzles is at low pressure because of the flow through bypass 101 and the flow through bypass solenoid valve 104. When the quantity of fruit is sensed at between 400 to 900, solenoid valves 102 and 104 are closed, and valve 103 is open. Since the bypass solenoid valve 104 is closed, full pressure from the pump in flowline 92 is unobstructed and flow is directed through open solenoid valve 103 so that the small nozzles 80, 83 are operating at high pressure.

As the quantity of fruit increases and this information is fed to computer 110, the solenoid valves 102, 103, 104 are opened or closed in order to provide desired pressure and volume of liquid wax at either or both the small or large nozzles of each set. As further examples, at the next range of quantity between 700 and 1200, solenoid valve 103 may be closed and solenoid valves 102 and 104 open so that the liquid substance is diriected to the large nozzles 79, 82 at low pressure. When the quantity of fruit is sensed as between 1200 and 1400, solenoid valve 103 and also the bypass valve 104 are closed so that the flow of the liquid substance to the large nozzles 79, 82 is at high pressure. When the quantity of fruit is read between 1400 and 1500, all of the solenoid valves 102, 103 and 104 are placed in open position by computer 110 and the flow of liquid substance to all large and small nozzles is at low pressure. When the quantity of fruit read is 1500 or greater, the computer 110 opens solenoid valves 102, 103 and closes solenoid valve 104 so that the flow of liquid substance to the large nozzles and the small nozzles is at high pressure. Thus, there are provided six varying stages or six levels at which the volume of liquid substance delivered to the nozzles large and small of each set is varied in terms of low and high pressure and with changes in volume of liquid sprayed.

In operation of the control system described above, the articles or fruit to be treated may be delivered to and fed to the elevator conveyor 21 in usual manner and preferably delivered in quantity so that the elevator conveyor 21 is substantially full and with the fruit lying between adjacent steel rolls in a transverse line as the elevator conveyor advances the fruit at a selected speed, which may vary, as sensed by the switch 36. As each row of fruit passes the transverse roll of fingers 40, the absence of fruit is noted and the quantity of fruit being actually advanced is computed by the computer 110. As the rows of fruit advance through the treating zone Z, the computer regulates the opening and closing of the solenoid valve means 102, 103 and 104 so that the amount of liquid wax substance sprayed from the sets of nozzles 79, 80 and 82, 83 are regulated in accordance with the speed of the conveyors and the quantity of fruit passing through the treating zone Z. In one example of the invention, the quantity of fruit sensed by the fingers 40 compared to the speed of the conveyor 21 is computed every five seconds so that the amount of liquid substance being sprayed by the sets of nozzles is continually modified in accordance with the quantity of fruit advancing on the conveyor. Such correlation of conveyor space and quantity of fruit may also be applied to the spraying of liquid substances by a plurality of fixed nozzles of at least two different sizes.

It should also be noted that the spray pattern of the large nozzles 79, 82 and the spray pattern of the smaller nozzles 80 and 83 are the same and may be about 90° or more. Thus, the use of two different sized spray patterns facilitates the spray treatment of relatively small quantities of fruit and also of relatively large quantities of fruit.

It will be readily apparent to those skilled in the art that the control means described above will supply a sufficient quantity of liquid wax and fungicide to the amount of fruit passing through the treating zone to assure a uniform and consistent shine on all surfaces of the fruit and will also provide a uniform fungicide protection on each of the fruit passing through the treating zone. Since the buildup of wax deposits on the brush roll conveyor 22 is of concern to packing house maintenance personnel, it will be readily apparent that spraying essentially only the amount of liquid substance required by the number of fruit passing through the treating zone more effectively utilizes the liquid substance sprayed, as well as minimizing and reducing the amount of wax which tends to accumulate on the brush roll conveyors. In addition, a more economical use of the liquid substance is assured.

It will be understood that the above description of the liquid substance control system is exemplary and that various modifications and changes may be made in the system which may fall within the spirit of this invention and which may be embraced by the claims appended hereto.

I claim:

1. In an apparatus for applying a liquid substance to the surfaces of a plurality of discrete objects advanced in variable quantities along a path of roll means structured to agitate said objects to augment exposure of surfaces of said objects to be coated, applicator means for said liquid arranged to spray said liquid in atomized form in a treating zone generally transversely of the path of travel of the objects, the improvement comprising in combination:
   means for determining the speed of advancement of the objects along said path;
   means for determining the quantity of objects moving pass a selected place along said path; and
   means for correlating the speed of advancement of said objects and variable quantities of said objects being advanced to regulate at the treating zone the amount of liquid discharged from said applicator means to provide optimum volume of liquid substance for application to the sensed quantity of objects.

2. An apparatus as stated in claim 1 wherein said liquid applicator means includes a large nozzle means on one side of said treating zone and small nozzle means on the other side of the treating zone.

3. An apparatus as stated in claim 2 including
   means for moving said large and small nozzles for reciprocal simultaneous transverse movement across the path of said objects;
   and means for supplying said liquid to each of said large and small nozzles at selected pressures.

4. An apparatus as stated in claim 3 wherein said means for supplying said liquid to said nozzles at selected pressures includes
   a liquid feed line to said large nozzle;
   a liquid feed line to said small nozzles;
   a solenoid valve in each of said lines;
   and a liquid supply line connected with said large and small nozzle feed lines.

5. An apparatus as stated in claim 4 wherein said liquid supply line includes
   a bypass line having a solenoid valve;
   said correlating means controlling each of said solenoid valve means for selection of a plurality of high and low pressure modes of operation at said large and small nozzles.

6. An apparatus as stated in claim 5 wherein said bypass line includes an accumulator chamber for dampening surges in the flow of said liquid.

7. An apparatus as stated in claim 2 wherein said nozzle means include
   two sets of large and small nozzles;
   means connecting said sets of nozzles for synchronous movement;
   and separate feed lines to each nozzle of each set.

8. An apparatus as stated in claim 1 including
   means for moving said applicator means in a path transversely to the path of said objects; and
   means determining the rate of movement of said applicator means and supplying such determinations to said correlating means.

9. A method of controlling the amount of liquid treating substance applied to a plurality of discrete fruit moving along a path at a selected rate of speed and in accordance with the variable quantity of fruit on said path, the application of liquid substance to the fruit being by more than one nozzle movable transversely over the path at a selected rate of speed in a spray zone, comprising the steps of:
   sensing the speed of movement of the fruit along said path;
   sensing the quantity of fruit on the path upstream from the application of the liquid substance at the spray zone;
   and correlating the speed of movement of the fruit, sensed quantity of fruit, the transverse rate of movement of the nozzles, and the discharge pressure of the nozzles applying the liquid substance to control and to furnish an optimum effective volume of liquid substance at selected pressure for the varying quantity of fruit on the path at the spray zone.

10. A method as stated in claim 9 including the step of applying liquid substance at each nozzle at the same nozzle pressure.

11. A method as stated in claim 9 including the step of applying liquid substance at different nozzles at different discharge pressure.

12. A method as stated in claim 9 including the step of feeding liquid substance to each nozzle by independently controlled feed lines.

13. A method as stated in claim 9 including the step of providing a bypass line for flow of liquid substance when feeding said liquid substance to each of said nozzles;
   and controlling the flow of liquid substance in said bypass line to modify liquid substance flow in said nozzle feed lines.

14. A method as stated in claim 13 including the step of connecting said bypass line and said nozzle feed lines with a single flowline having flow control means.

15. A method as stated in claim 9 including
   performing the steps of claim 9 every five seconds to continually monitor and adjust the volume of liquid substance.

16. A method as stated in claim 9 including the step of sensing the steps of claim 9 at selected time intervals and monitoring and adjusting the volume of liquid flow according thereto.

17. A method as stated in claim 9 including the step of:
providing at least two nozzles, the two nozzles having orifices at different sizes.

18. A method as stated in claim 9 including the steps of:
providing more than one set of nozzles, each nozzle of each set of different size.

19. In an apparatus for controlling the amount of liquid substance applied to a variable quantity of discrete fruit moving through a treating zone at a selected rate of speed the combination of:
applicator means including nozzle means for spraying said liquid substances in said treating zone generally transverse to the path of travel of the fruit;
means for advancing the fruit through said treating zone;
sensing means upstream from the treating zone determining the speed of advancement of the fruit;
sensing means upstream from the treating zone for determining the variable quantity of fruit moving into said treating zone;
means for correlating the speed of advancement of the fruit and the variable quantities of said fruit as sensed by said sensing means;
and control means connected with said correlating means for regulating at the treating zone a selected amount of liquid substance to be discharged from said applicator means whereby optimum volume of liquid substance is discharged by said nozzles in the treating zone for coating the variable sensed quantity of fruit.

* * * * *